(12) United States Patent
Kuribayashi et al.

(10) Patent No.: US 6,898,174 B2
(45) Date of Patent: May 24, 2005

(54) OPTICAL RECORDING MEDIUM (75) Inventors: Isamu Kuribayashi, Tokyo (JP);
Masanori Shibahara, Tokyo (JP);
Hajime Utsunomiya, Tokyo (JP);
Toshiki Aoi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/445,341

(22) Filed: May 27, 2003

(65) Prior Publication Data
US 2003/0210642 A1 Nov. 13, 2003

Related U.S. Application Data (63) Continuation of application No. PCT/JP01/10314, filed on Nov. 27, 2001.

(30) Foreign Application Priority Data

Nov. 27, 2000 (JP) .......................................... 2000-359252

(51) Int. Cl.$^7$ ................................................ G11B 7/24
(52) U.S. Cl. ............................... 369/275.4; 369/47.53; 428/64.4
(58) Field of Search ........................... 369/275.2, 275.4, 369/275.1, 288, 47.53, 47.51, 53.2, 59.12; 428/64.1, 64.5, 64.4; 430/270.13

(56) References Cited

U.S. PATENT DOCUMENTS

| | | | |
|---|---|---|---|
| 6,169,722 B1 * | 1/2001 | Kikukawa et al. ....... | 369/275.4 |
| 6,242,157 B1 | 6/2001 | Tominaga et al. | |
| 6,430,128 B1 * | 8/2002 | Kato et al. ................ | 369/47.53 |
| 6,461,710 B1 * | 10/2002 | Kikukawa et al. ......... | 428/64.1 |
| 6,515,952 B1 * | 2/2003 | Kikukawa et al. ....... | 369/59.12 |

FOREIGN PATENT DOCUMENTS

| | | |
|---|---|---|
| EP | 0 735 158 A2 | 10/1996 |
| EP | 0 898 272 A2 | 2/1999 |
| EP | 1 011 099 A1 | 6/2000 |
| JP | 4-278224 | 10/1992 |
| JP | 4-366424 | 12/1992 |
| JP | 9-7176 | 1/1997 |
| JP | 9-286175 | 11/1997 |
| JP | 2000-231725 | 8/2000 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

The optical recording medium of the present invention is a phase change optical recording medium which can be used as a write once medium and which can be recorded at a high recording density. The optical recording medium of the present invention is adapted for recording such that, when the recording beam has a wavelength of λ, and objective lens of recording optical system has a numerical aperture of NA, minimum record marks formed are circular or ellipsoidal marks having a length of 0.4 λ/NA or less; and the medium is a write once medium wherein the recorded information can not be erased or rewritten at the minimum linear velocity used.

4 Claims, 5 Drawing Sheets

FIG. 1

LASER BEAM

FIG. 2

LASER BEAM

OPTICAL RECORDING MEDIUM

CROSS-REFERENCES TO RELATED APPLICATIONS

This application claims priority to International Application No. PCT/JP01/10314 filed on Nov. 27, 2001 and Japanese Application No. 2000-359252, filed on Nov. 27, 2000, and the entire content of both applications is hereby incorporated by reference.

BACKGROUND OF THE INVENTION

1. Field of the Invention

This invention relates to an optical recording medium having a phase change recording layer which is used as a write once medium.

2. Description of the Background

Highlight is recently focused on optical recording media capable of recording information at a high density. Typical optical recording mediums include write once media which can be recorded only once and which can not be rewritten, and rewritable media wherein repeated rewriting has been enabled.

Write once media are unrewritable media which are adapted for use in documents wherein tampering of the information recorded therein may cause a serious problem as in the case of official documents. The most widely employed write once media are those using an organic dye for the recording material. Use of an organic dye, however, is associated with the difficulty of realizing a high transfer rate since recording sensitivity is likely to be insufficient when the recording is accomplished at a high speed by increasing the linear velocity of the medium. An organic dye also has relatively steep absorption spectrum and reflection spectrum, and a careful choice of the organic dye is required so that the organic dye chosen corresponds to the recording/reading wavelength. For example, when there is a high-end format which requires use of a recording/reading beam of shorter wavelength, a problem may arise that the medium of low-end format can not be recorded/read by the recording/reading beam adopted in the high-end format. There may also arise the problem that dyes corresponding to the recording/reading of shorter wavelength are difficult to design and purchase.

On the other hand, there are rewritable recording media of phase change type wherein the medium is recorded by changing the crystalline state of the recording layer by irradiating a laser beam, and read by detecting the change in the reflectivity induced in the recording layer by such change in the crystalline state. In the phase change medium which can be rewritten by overwriting, amorphous record marks are formed by irradiating the medium with a laser beam of recording power level to melt the crystalline recording layer and quenching the molten recording layer to thereby form the amorphous record marks. In the erasure, the medium is irradiated with a laser beam of erasing power level to heat the recording layer to a temperature of not less than the crystallization temperature and less than the melting temperature followed by gradual cooling to thereby crystallize the amorphous record marks. Accordingly, the overwriting can be accomplished by irradiating a single laser beam with its intensity modulated.

The medium having a phase change recording layer can be also used as a write once medium in addition to the rewritable medium as described above. When such medium is used as a write once medium, it is necessary that the amorphous record mark formed is both unerasable and unrewritable.

In the case of the write once medium produced by using an organic dye, the recording process is associated with the decomposition of the organic dye. Accordingly, it is generally believed that laser power used in the recording should be increased by $2^{1/2}$ folds when the linear velocity used in the recording is doubled. In contrast, when a phase change medium is used for the write once medium, the only requirement is that the part of the medium irradiated with the recording laser beam reaches its melting point. Since the recording layer almost instantaneously absorbs the laser beam and reaches the melting point, the power of the recording laser beam does not considerably depend on the linear velocity used in the recording. In other words, there is a merit that only slight increase in the power of the recording laser beam is required even if the linear velocity used in the recording were doubled.

In spite of such situation, there has been no useful proposal on the use of a phase change medium for the write once medium.

SUMMARY OF THE INVENTION

An object of the present invention is to provide a phase change optical recording medium which can be used as a write once medium and which can be recorded at a high recording density.

Such objects are attained by the present invention as described in (1) to (5), below.

(1) An optical recording medium wherein the medium has a phase change recording layer wherein the recording is accomplished such that, when the recording beam has a wavelength of λ, and objective lens of recording optical system has a numerical aperture of NA, minimum record marks formed are circular or ellipsoidal marks having a length of 0.4 λ/NA or less; and the medium is a write once medium wherein the recorded information can not be erased or rewritten at the minimum linear velocity used.

(2) An optical recording medium according to the above (1) wherein relations:

$$0.5 \leq x \leq y/2 + 0.02 V_{min} + 0.57 \text{ and } x \leq 0.9,$$

$$0 \leq y \leq 0.4$$

are satisfied when atomic ratio of the elements constituting said recording layer is represented by:

$$(Sb_xTe_{1-x})_{1-y}M_y \qquad (I)$$

wherein M is an element which is neither Sb nor Te, and the minimum linear velocity used is Vmin (m/s).

(3) An optical recording medium according to the above (1) or (2) wherein the recording is accomplished such that no recrystallized region is present around the record marks.

(4) An optical recording medium according to any one of the above (1) to (3) wherein the recorded information can not be erased or rewritten at a linear velocity equal to or higher than 3.49 m/s.

(5) An optical recording medium according to any one of the above (1) to (3) wherein the recorded information can not be erased or rewritten at a linear velocity equal to or higher than 1.2 m/s.

DESCRIPTION OF THE PREFERRED EMBODIMENTS

Increase in the recording density has been a demand for a phase change medium irrespective of whether the medium is a rewritable medium or a write once medium. However, if shorter record marks are employed for the purpose of increasing the recording density, the medium is likely to be associated with the reduced output and increased jitter in the reading operation. In view of such situation, JP-A 2000-231725 proposes improvement of the output decrease and the jitter increase associated with the high density recording by controlling the shape of the minimum record mark. To be more specific, JP-A 2000-231725 describes a method of optical recording wherein minimum record marks having the shape like a bat with expanded wings wherein a part of the rear edge is curved (recessed) toward the front (leading) edge. JP-A 2000-231725 discloses that such minimum record mark with the shape like a bat with expanded wings can be formed by controlling the conditions used in the recording. When the recording layer in crystallized state is irradiated with the recording laser beam, the area irradiated melts, and when the laser beam moves away, the molten area becomes quenched and the amorphous record mark is formed. When the pattern of intensity modification is adequately controlled in such process in order to control the cooling speed of the area near the rear end of the molten area, the rear portion of the molten area can be recrystallized, and as a consequence, only the front portion of the molten area becomes amorphous, and the amorphous record marks having the shape like a bat with expanded wings are thereby formed.

In the method described in JP-A 2000-231725, width of the record mark can be increased in relation to the length of the record mark to thereby suppress the decrease in the output due to the decrease in length of the record mark. As a result, the record marks have sufficient width, and hence, the output in the reading is at sufficient level in JP-A 2000-231725 even when the length of the minimum record mark were reduced to as short as 0.4 λ/NA or below when the wavelength of the beam used in the recording was λ, and the numerical aperture of the objective lens in the recording optical system was NA. In JP-A 2000-231725, the jitter is also reduced by forming the minimum record marks of such shape.

The inventors of the present invention prepared a phase change medium having a recording layer of relatively slow crystallization speed, and used this medium as a write once medium by adopting a relatively high linear velocity. The recording conditions were then determined so that the minimum record marks will have a length of 0.4 λ/NA or shorter, and the rear portion of the molten area will be recrystallized as in the case of the rewritable medium described in the Example of the JP-A 2000-231725. However, the jitter was high in this case in contrast to the case of the rewritable medium described in the JP-A 2000-231725.

The reason for the increase of the jitter in the experiment as described above wherein the write once medium was recorded at a high density is assumed as described below. In the experiment as described above, the recording layer designed to have a relatively low crystallization speed and a high linear velocity was used in order to use a phase change medium as a write once medium. The molten recording layer, however, is less likely to become recrystallized under such conditions. Accordingly, the recrystallization of the rear portion of the molten area did not proceed in a stable manner, and this resulted in the variation in the rear edge position and shape of the record marks. The influence of such variation is greater when the record marks have a shorter length. Therefore, when the minimum record mark was as short as 0.4 λ/NA or less, the jitter of the minimum signal became increased, and since the jitter of the minimum signal has strong influence on the jitter of the entire recorded signals, the jitter of the random signal became poor.

On the bases of such experimental results, the inventors of the present invention attempted to suppress the variation in the record mark shape by recording the medium under the conditions wherein recrystallization of the rear portion of the molten area in the recording layer is reduced. To be more specific, crystallization speed of the recording layer and the thermal design of the medium were controlled on the bases of the linear velocity used in the recording, and also, optimal recording conditions were selected so that sensitivity in the recording is maintained at a sufficient level and the minimum record mark will have a circular or ellipsoidal shape. However, if it was only that the minimum record marks were formed in circular or ellipsoidal shape, output in the recording becomes reduced. In view of such situation, the composition of the recording layer has been selected in the present invention so that the crystallization speed becomes relatively slow while change in reflectivity between the crystalline and amorphous phases are maintained at a sufficient level. As a consequence, there has been realized by the present invention a phase change medium formed with a recording layer having the crystallization speed that would enable use of the medium as a write once medium, and which exhibits reduced jitter as well as sufficiently high output in the in reading even when the medium is recorded at a high density.

It is to be noted that, in the present invention, the medium that had been recorded at a high density is evaluated as exhibiting a sufficient output in the reading when the minimum signal exhibits a CNR (carrier to noise ratio) of at least 45 dB, and preferably at least 48 dB when the length of the minimum record mark is up to 0.4 λ/NA.

Figure 5:
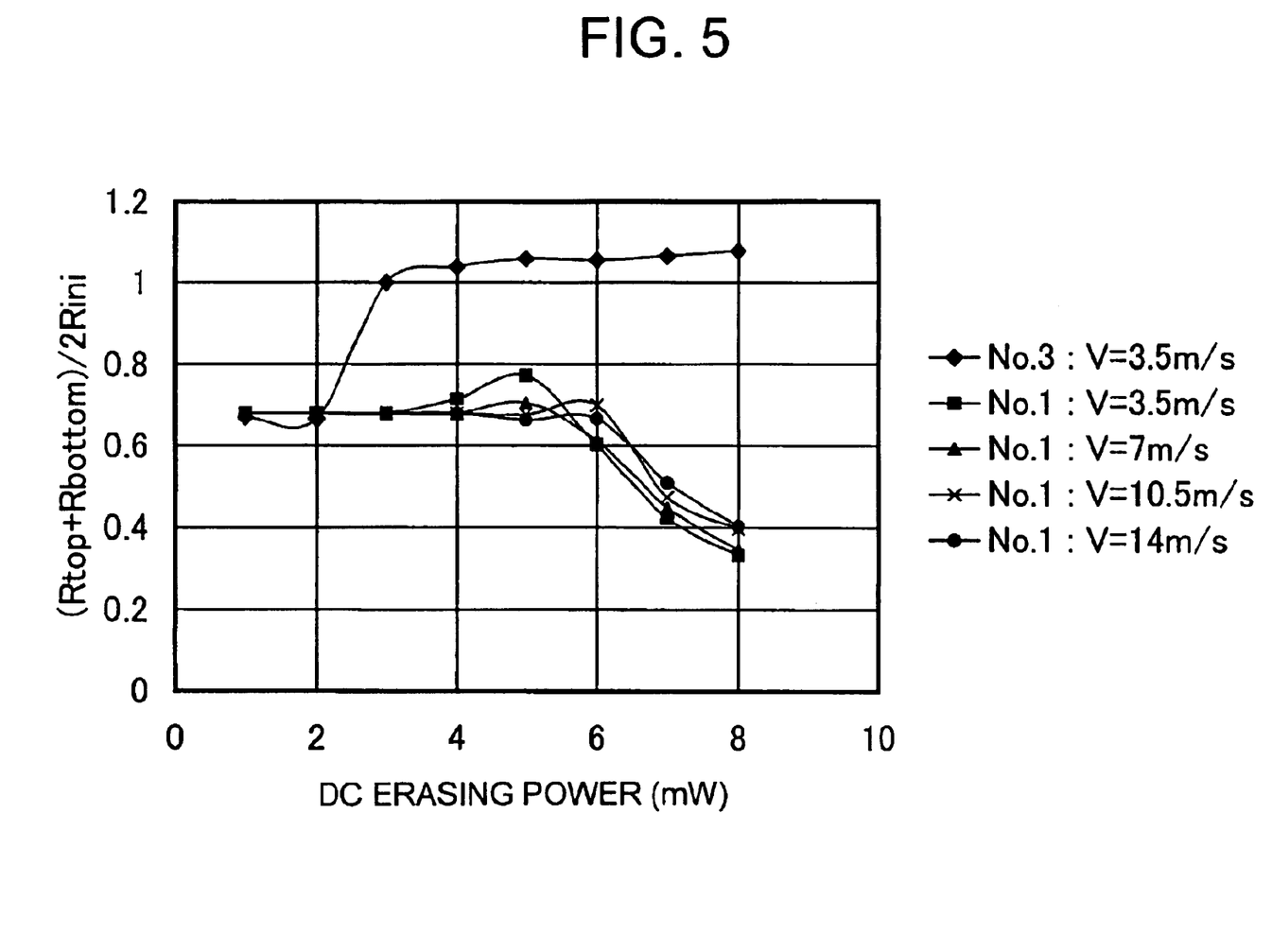
FIG. 5 is a graph showing $(R_{top}+R_{bottom})/2R_{ini}$ in relation to DC erasing power.
Figure 6:
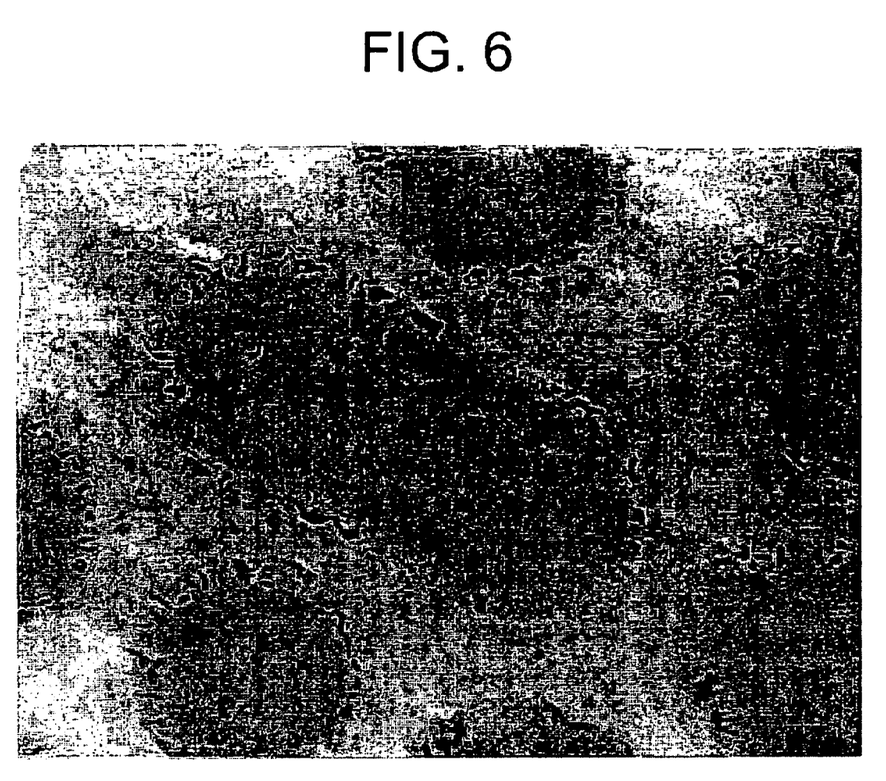
FIG. 6 is another photomicrograph taken by a transmission electron microscope of a recording layer wherein the record marks are surrounded by recrystallized region, and this photograph is presented as a substitute for a diagram showing crystalline structure.

By the way, substantially circular record marks are disclosed in FIGS. 5 and 6 of the above mentioned JP-A 2000-231725 as the Comparative Example. These record marks have been formed by using a relatively low recording power in order to prevent recrystallization of the rear portion of the molten area in the recording. The composition of the recording layer (in atomic ratio) wherein these record marks had been formed is disclosed in Paragraph Nos. 0071 and 0052 of the JP-A 2000-231725, and the composition is:

$$Ag_aIn_bSb_cTe_d$$

wherein
 a=0.07,
 b=0.05,
 c=0.59, and
 d=0.29.
When expressed in the form of:

$$(Sb_xTe_{1-x})_{1-y}(Ag,In)_y$$

x=0.67, and
 y=0.12.

It should also be noted that the circular record marks were formed at a linear velocity of 1.2 m/s. In the case of the recording layer having such composition, the record marks can be erased at a linear velocity of 1.2 m/s. In the case of the medium of the present invention wherein the record marks are unerasable at the linear velocity of 1.2 m/s, x expressing the content of the Sb is smaller, and the output in the reading will be higher.

In the medium of the present invention, it is desirable that no recrystallized region is formed around the amorphous record marks in the formation of the record marks. In contrast, the amorphous record marks are surrounded by the recrystallized region in the case of conventional phase change recording mediums as described in JP-A 9-7176 (see FIG. 2) and JP-A 4-366424 (see FIG. 2). Such recrystallized region is formed by the mechanism as described below.

The beam spot of the laser beam used in the recording of an optical recording medium is substantially circular in shape, and the energy distribution in the beam spot resembles Gaussian distribution. Accordingly, in the area of the phase change recording layer irradiated with the recording laser beam, the central region is heated to a temperature higher than that of the peripheral region, and after the irradiation, the heat is transmitted from the central region of the irradiated area to the peripheral region. As a consequence, the cooling speed in the peripheral region of the irradiated area is retarded, and as a result of such retarded cooling in the peripheral region, this region becomes recrystallized without being amorphicized despite its melting by the laser beam irradiation. This mechanism results in the formation of the recrystallized region around the amorphous record marks.

Grains size of the thus formed recrystallized region is different from that of the crystals formed by the initialization (crystallization of the entire surface of the recording layer), and also, different from that of the crystals formed by the erasing operation. Such different grain size results in the different reflectivity to the beam, and hence, in the ambiguous outer edge of the record marks and poor performance in the reading. This is particularly evident in the case of mark edge recording wherein detection of the edge position of the record marks is critical, and uncertain record mark length and vague edges invite increase in the jitter.

In contrast, in the preferred embodiments of the present invention, no recrystallized region is present around the record marks and the signal quality is quite high, and the jitter is thereby reduced. Recrystallization of the area surrounding the record marks may be accomplished by adequately determining the composition of the recording layer and/or thermal design of the medium.

As mentioned above, formation of substantially circular record marks is disclosed in the JP-A 2000-231725. The medium used in this Comparative Example, however, is the medium wherein the composition and thermal design had been optimized to enable rewriting at a linear velocity of 3.5 m/s, and the medium would not be a write once medium when the medium is used at a linear velocity of 1.2 m/s which is the linear velocity used in this Comparative Example. In addition, such medium is likely to experience recrystallization around the record marks. In FIGS. 5 and 6 of JP-A 2000-231725, the substantially circular record marks are indeed surrounded by the recrystallized region which is crystalline but different from the crystalline phase of the unrecorded area.

The present invention is particularly adapted for use as a medium of the type wherein amorphous record marks are formed in the crystalline recording layer. The present invention, however, is also applicable to a medium of the type wherein crystalline record marks are formed in the amorphous recording layer.

Next, the medium of the present invention is described by referring to a preferred embodiment.

Figure 1:
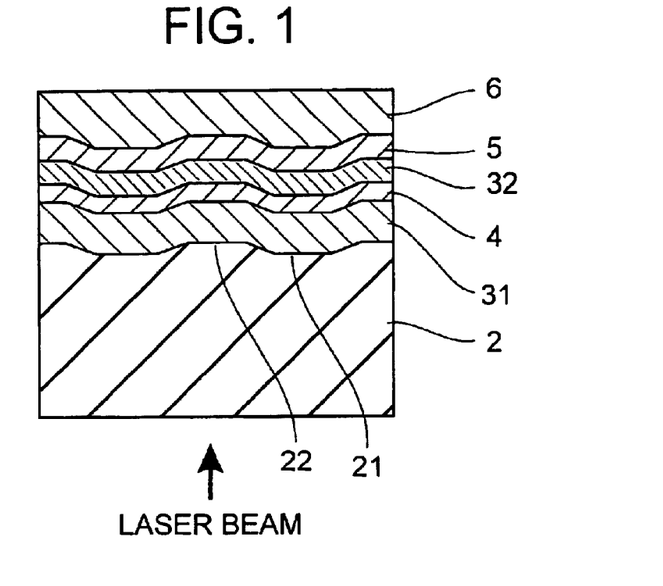
FIG. 1 is a partial cross sectional view of the optical recording medium according to an embodiment of the present invention.

Structure Shown in FIG. 1

An embodiment of the optical recording medium of the present invention is shown in FIG. 1. This optical recording medium comprises a light-transparent substrate 2, and a first dielectric layer 31, a recording layer 4, a second dielectric layer 32, a reflective layer 5, and a protective layer 6 deposited on the light-transparent substrate 2 in this order. The laser beam for recording or reading enters the medium through the light-transparent substrate 2.

Light-transparent Substrate 2

The light-transparent substrate 2 is transparent to the laser beam used for recording or reading. The thickness of the light-transparent substrate 2 is generally in the range of 0.2 to 1.2 mm, and preferably, in the range of 0.4 to 1.2 mm, and the light-transparent substrate 2 may typically comprise a resin, or alternatively, a glass. The grooves (guide grooves) 21 generally provided on the optical recording medium are the regions located closer to the side of the laser beam incidence, and the regions defined between two adjacent grooves are the lands 22.

In the present invention, the lands and/or grooves may be used for the recording track.

First Dielectric Layer 31 and Second Dielectric Layer 32

These dielectric layers prevent oxidation and degradation of the recording layer, and also, protect the light-transparent substrate 2 from the heat transmitted from the recording layer during the recording by blocking the heat or by dissipating such heat in lateral direction of the layer. Provision of the dielectric layers also contributes for improving the degree of modulation. Each dielectric layer may also comprise a laminate of two or more dielectric layers each having different compositions.

The dielectric material used for these dielectric layers is preferably a compound containing at least one metal component selected from Si, Ge, Zn, Al, and rare earth metals, and the compound is preferably an oxide, a nitride, or a sulfide. A mixture containing two or more of the foregoing may also be used.

The thickness of the first and the second dielectric layers may be adequately determined so that sufficient improvement in the protection and degree of modulation are achieved. However, the first dielectric layer 31 is preferably deposited to a thickness of 30 to 300 nm, and more preferably 50 to 250 nm, and the second dielectric layer 32 is preferably deposited to a thickness of 10 to 50 nm.

The dielectric layers are preferably formed by sputtering.

Recording Layer 4

The recording layer is not particularly limited for its composition, and the material used may be adequately selected from various phase change materials, and preferably, from those containing at least Sb and Te. However, crystallization temperature of the recording layer containing Sb and Te as the only components is as low as about 130° C., and the storage reliability is insufficient. For the increase in the crystallization temperature, the recording layer may preferably comprise elements other than Sb and Te. Such element is preferably at least one element selected from In, Ag, Au, Bi, Se, Al, P, Ge, H, Si, C, V, W, Ta, Zn, Ti, Sn, Pb, Pd, and rare earth elements (Sc, Y, and lanthanoids), and among these, the preferred is at least one element selected from rare earth elements, Ag, In, and Ge in view of the particularly high ability to improve the storage reliability.

The composition containing Sb and Te used for write once recording layer is preferably the one as described below, namely, the one wherein the composition represented by the atomic ratio of the elements constituting the recording layer is:

$$(Sb_xTe_{1-x})_{1-y}M_y \qquad (I)$$

wherein M is an element which is neither Sb nor Te. x and y in formula (I) when the medium is used at a minimum linear velocity of $V_{min}$ (m/s) is in the ranges:

$$0.5 \leq x \leq y/2 + 0.02V_{min} + 0.57, \text{ and } x \leq 0.9,$$

$$0 \leq y \leq 0.4,$$

and preferably, in the ranges:

$$y/2 + 0.02V_{min} + 0.5 \leq x \leq y/2 + 0.02V_{min} + 0.57 \text{ and}$$

$$x \leq 0.9,$$

$$0 \leq y \leq 0.4.$$

When x representing the content of Sb is too small in the formula (I), crystallization speed will be excessively low, and initialization of the recording layer will be difficult. On the other hand, when x is greater than $y/2+0.02V_{min}+0.57$, erasure (crystallization) will be possible at the linear velocity $V_{min}$, and the medium can no longer be used as a write once medium. In addition, when x is large, and in particular, when x is in excess of 0.9, difference in reflectivity between the crystalline phase and the amorphous phase will be insufficient, and output will be reduced in the reading. As described above, when x is within the range as described above, the recording layer will be provided with a crystallization speed just sufficient for the recording layer of a write once medium, and also, sufficient increase in the output will be enabled.

It is to be noted that the relation: $x \leq y/2+0.02V_{min}+0.57$ was experimentally determined by the procedure as described below. First, a plurality of media having different x and/or y values were prepared, and erasure of the recorded information was attempted for each of such media at various linear velocities to thereby determine the critical linear velocity at which the erasure became impossible in each medium. Next, the relation between the critical linear velocity and the x and the y was expressed in terms of a linear equation. When the critical linear velocity was represented by V, the relation could be expressed as the linear equation: $x=y/2+0.02V+0.57$.

In the present invention, the minimum linear velocity $V_{min}$ at which the medium is used means the standard linear velocity (also referred to as the "single speed") or its minimum value defined in the specification to which the medium of the present invention belongs, or in the specification which is highly compatible with the medium of the present invention. For example, the standard linear velocity of the CD-R, a well known write once compact disk and the CD-RW, a well known rewritable compact disk is 1.2 to 1.4 m/s, and accordingly, when the medium of the present invention is used as a write once medium which is highly compatible with the CD-R or the CD-RW, the $V_{min}$ is 1.2 m/s. For the optical disks known to belong to the DVD (Digital Versatile Disk) specification, the standard linear velocity of the write once DVD-R and the rewritable DVD-RW is 3.49 m/s, and accordingly, when the medium of the present invention is used as a write once medium which is highly compatible with the DVD-R or the DVD-RW, the $V_{min}$ is 3.49 m/s. In an optical disk drive, generally, the medium is seldom erased or rewritten at a speed lower than the single speed after the writing operation of the medium, and also, the erasing and rewriting are easier if such operations are carried out at a lower linear velocity. In view of such situation, the composition of the recording layer is limited in the present invention on the bases of the $V_{min}$.

It is to be noted that the minimum linear velocity used in the present invention is not particularly limited. The linear velocity used in the initialization, however, needs to be generally lower than the linear velocity used in the recording, and if the recording layer is optimized for a low recording linear velocity, the linear velocity used in the initialization should be even lower to detract from the productivity of the medium. The recording layer optimized for an extremely low linear velocity may also become incapable of being initialized. On the other hand, when the recording linear velocity is too fast, adjustment of the axial runout within the allowable range becomes difficult, and the oscillation of the motor used for driving the medium may become large unless the medium is the one enjoying an extremely high mechanical precision, and stable recording becomes difficult. In view of such situation, the minimum linear velocity used is preferably in the range of 1 to 20 m/s, and in particular, 1 to 15 m/s.

The element M is not particularly limited. However, it is preferable to select at least one member from the above-indicated elements for the M in view of storage reliability. When y representing the content of the element M is excessively large, output in the reading will be reduced.

The recording layer is preferably formed to a thickness of more than 4 nm to 50 nm, and more preferably, to a thickness of 5 nm to 30 nm. When the recording layer is too thin, growth of the crystalline phase will be difficult to render the crystallization difficult. When the recording layer is too thick, the recording layer will have an increased heat capacity to render the recording difficult. An excessively thick recording layer also results in the reduced output in the reading.

The recording layer is preferably formed by sputtering.

It is to be noted that the recording layer of the present invention is not limited for its structure, and the present invention is applicable to a medium having a recording layer of multilayer structure, for example, those described in JP-A 8-221814 and JP-A 10-226173.

Reflective Layer 5

In the present invention, the reflective layer may be formed from any desired material, and typically, from a metal or a semimetal such as Al, Au, Ag, Pt, Cu, Ni, Cr, Ti or Si as a simple substance or as an alloy containing at least one of such metals.

The reflective layer is typically deposited to a thickness of 10 to 300 nm. The reflectivity is less likely to be sufficient when the thickness is below such range, and deposition to a thickness beyond such range is economically disadvantageous since no substantial improvement in the reflectivity is attained by additional increase in the thickness. The reflective layer is preferably formed by vapor deposition such as sputtering and evaporation.

Protective Layer 6

The protective layer 6 is provided for improving scratch resistance and corrosion resistance. Preferably, the protective layer is formed of an organic material, and typically, a radiation curable compound or a composition thereof which has been cured with radiation such as electron beam or UV radiation. The protective layer may generally have a thickness of about 0.1 to about 100 μm, and may be formed by conventional techniques such as spin coating, gravure coating, spray coating, and dipping.

Figure 2:
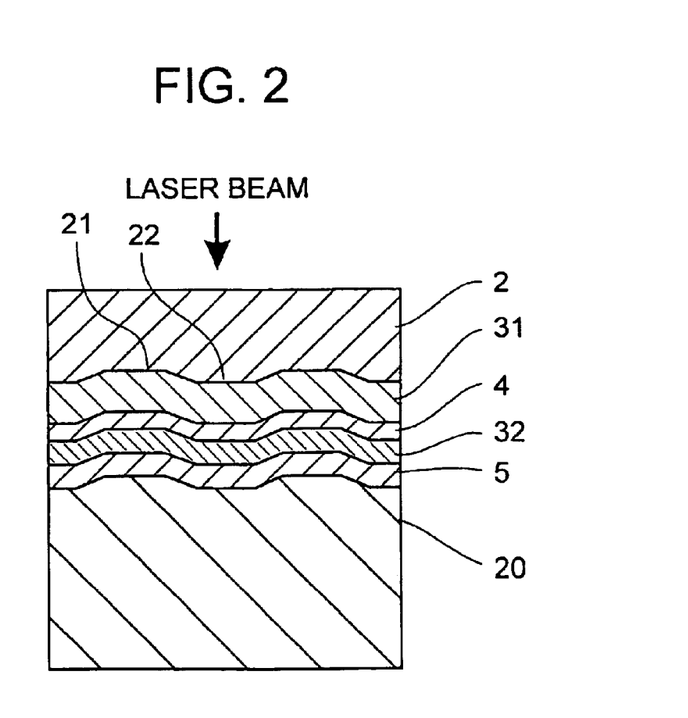
FIG. 2 is a partial cross sectional view of the optical recording medium according to another embodiment of the present invention.

Structure Shown in FIG. 2

FIG. 2 shows another embodiment of the optical recording medium of the present invention. This medium comprises a supporting substrate 20, and a reflective layer 5 comprising a metal or a semimetal, a second dielectric layer 32, a recording layer 4, a first dielectric layer 31, and a light-transparent substrate 2 deposited on the supporting substrate 20 in this order. The laser beam for recording or reading enters the medium through the light-transparent substrate 2. It should be noted that an intermediate layer comprising a dielectric material may be optionally provided between the supporting substrate 20 and the reflective layer 5.

The light-transparent substrate 2 of this embodiment may comprise a resin plate or a glass plate of the thickness substantially equivalent to that of the light-transparent substrate 2 of FIG. 1. However, when the high recording density is to be attained by increasing the NA of the recording/reading optical system, reduction in the thickness of the light-transparent substrate 2 is highly desired, and the thickness of the light-transparent substrate is preferably in the range of 30 to 300 82 m. When the light-transparent substrate is too thin, the medium will suffer from the optical influence of the dust on the surface of the light-transparent substrate. An excessively thick light-transparent substrate, on the other hand, will result in the difficulty of enabling the high density recording by increasing the NA.

The thin light-transparent substrate 2 may be provided, for example, by bonding a light-transparent sheet comprising a light-transparent resin on the first dielectric layer 31 by means of an adhesive or a pressure-sensitive adhesive, or by directly forming the light-transparent resin layer on the first dielectric layer 31 by coating.

The supporting substrate 20 is provided for the purpose of maintaining the rigidity of the medium. The thickness and the material used for the supporting substrate 20 may be the same as the one used for the light-transparent substrate 2 in the embodiment of FIG. 1, and the supporting substrate 20 may be either transparent or non-transparent. The grooves 21 may be provided by transcription of the shape of the grooves formed on the supporting substrate 20 to the layers formed thereon as shown in the drawings.

In the medium having the structure as shown in FIG. 2, surface roughness of the reflective layer on the side of the laser beam incidence is likely to increase with the crystal growth in the formation of the reflective layer 5, and such increase in the surface roughness is associated with the noise in the reading. Accordingly, decrease in the grain size of the reflective layer or formation of the reflective layer as an amorphous layer is desirable, and the reflective layer is preferably formed as a layer mainly comprising silver or aluminum and also including other elements as described above.

It is to be noted that heat conductivity of the reflective layer decreases with the decrease in the grain size, and accordingly, if the reflective layer was amorphous, a sufficient cooling speed is less likely to be achieved in the recording. The reflective layer, therefore, is preferably formed as an amorphous layer, and then heat treated for crystallization. When the reflective layer is formed as an amorphous layer, and thereafter crystallized, the surface roughness in the amorphous state is substantially maintained even after the crystallization, and also, increase in the heat conductivity by the crystallization is ensured.

Other layers are the same as those described for the embodiment of FIG. 1.

EXAMPLES

Example 1

Sample No. 1 of the optical recording disk having the constitution as shown in FIG. 1 was prepared by using a light-transparent substrate 2 produced by injection molding a polycarbonate in the shape of a disk having a diameter of 120 mm and a thickness of 0.6 mm, and forming grooves having a width of 0.2 μm and a depth of 20 nm at a pitch of 0.74 μm simultaneously with the injection molding; and disposing a first dielectric layer 31, a recording layer 4, a second dielectric layer 32, a reflective layer 5, and a protective layer 6 on the surface of the light-transparent substrate 2 by the procedure as described below.

The first dielectric layer 31 was formed by sputtering in argon atmosphere using ZnS (80 mole %)—SiO$_2$ (20 mole %) for the target. The first dielectric layer 31 was formed to a thickness of 90 nm.

The recording layer 4 was formed by sputtering in argon atmosphere. The recording layer 4 had a composition (atomic ratio) of $(Sb_{0.67}Te_{0.33})_{0.9}(In_{0.4}Ag_{0.6})_{0.1}$ The recording layer 4 was formed to a thickness of 20 nm.

The second dielectric layer 32 was formed by sputtering in argon atmosphere using ZnS (50 mole %)—SiO$_2$ (50 mole %) for the target. The second dielectric layer 32 was formed to a thickness of 20 nm.

The reflective layer 5 was formed by sputtering in argon atmosphere using Al—1.7 mole % Cr alloy for the target. The reflective layer 5 was formed to a thickness of 100 nm.

The protective layer 6 was formed by applying a UV curable resin by spin coating and exposing it to UV for curing. The protective layer as cured had a thickness of 5 μm.

The thus produced Sample No. 1 was initialized with a bulk eraser at a linear velocity of 2 m/s.

Sample No. 1 was placed on an optical recording medium evaluator (DDU-1000, manufactured by Pulstech). The medium was then recorded with the minimum signal and the random signal once for each signal under the conditions as described below:

laser beam wavelength λ: 635 nm, numerical aperture, NA: 0.6 recorded signal: single (3T signal which is the minimum signal) and random signal of EFM plus (8–16) modulation linear velocity: 3.5 m/s (length of the minimum signal: 0.38 λ/NA). The recorded information was then read at a reading power of 0.9 mW.

Figure 3:
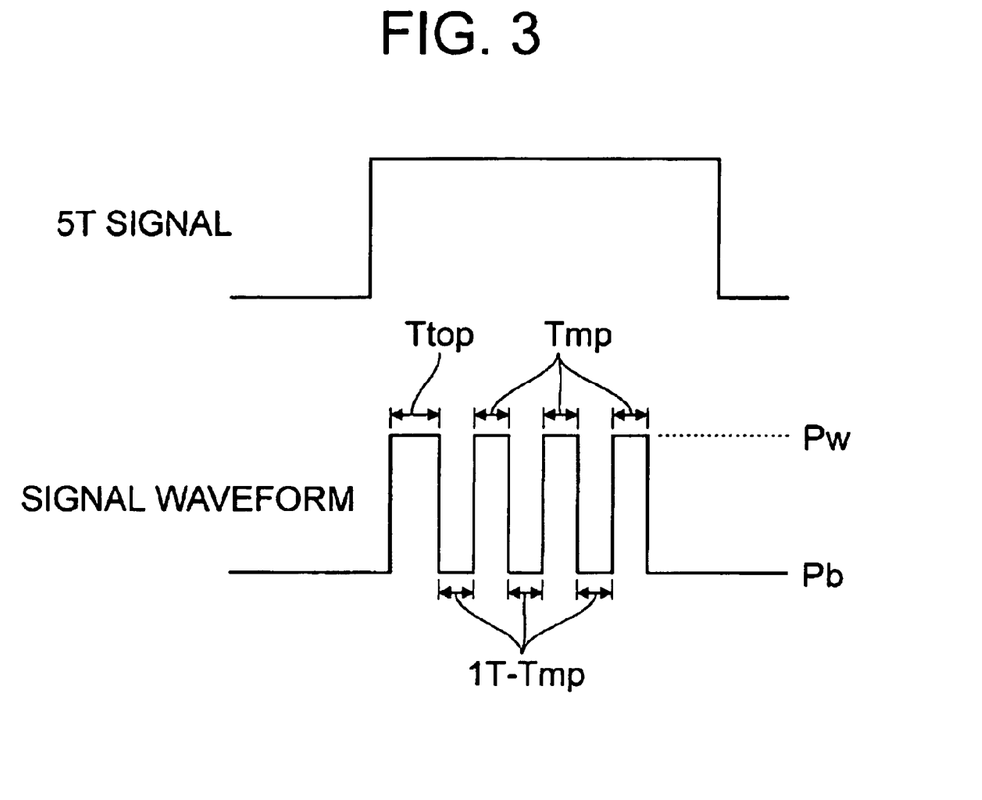
FIG. 3 is a graph showing 5T signal and the recording waveform.

The pattern of modulating the intensity of the laser beam in the recording is described hereinbelow. An optical recording medium of phase change type is generally recorded, not by irradiating the medium with the beam of the constant recording power for the duration corresponding to the length of the record mark, but by multi-pulse recording as described in JP-A 2000-155945. An exemplary recording waveform in the multi-pulse recording is shown in FIG. 3. It should be noted that the term "recording waveform" used herein designates the driving signal pattern used for modulation of the intensity of the recording beam. FIG. 3 illustrates 5T signal of NRZI signal and recording waveform corresponding to such 5T signal. In FIG. 3, Pw is recording power, and Pb is bias power. In an overwritable recording system, Pb is generally referred to as the erasing power. This recording waveform comprises the recording pulse section which is used in forming the record marks and the DC section connecting the adjacent recording pulse section. The recording pulse section is constituted from repeated combination of an upward pulse (with the intensity of Pw) and the subsequent downward pulse (with the intensity of Pb), and as a whole, this section rises from Pb and returns to Pb. In FIG. 3, $T_{top}$ represents width of the top upward pulse, and $T_{mp}$ represents width of the upward pulses other than the top pulse (which are also referred to as multi-pulse). Such pulse width is indicated by the value normalized with standard clock width (1T).

In this example, the medium was recorded by using such waveform under the conditions:

recording power $P_w$: 9 mW, bias power $P_b$ : 0.5 mW, $T_{top}$ : 0.6T, and $T_{mp}$ : 0.35T.

It is to be noted that the number of upward pulse in the recording pulse section was one in the minimum signal (3T signal), and its width was the $T_{top}$ as described above. This recording condition is the optimal recording condition wherein the clock jitter is minimized.

After the recording, the minimum signal was evaluated for the CNR by using a spectrum analyzer (manufactured by Advantest), and the CNR was 49.1 dB. The random signal was evaluated for the clock jitter and output in the reading, and they were 8.5% and 1.04 V, respectively. A clock jitter of up to 9% indicates that the signals are readable at a practically acceptable level. However, when the clock jitter is in excess of 13%, and in particular, in excess of 15%, errors will be frequently generated, and the signal will not be usable as an output signal. It is to be noted that the clock jitter was determined by reading the signal on a time interval analyzer (manufactured by Yokogawa Electric Corporation) to determine the "signal fluctuation (σ)" by σ/Tw (%)

wherein Tw represents the window width. The output in the reading was evaluated by using an analogue oscilloscope.

Next, the track recorded with signals was irradiated by the DC laser beam with the output of 2 to 7 mW at a linear velocity of 3.5 m/s as an attempt to erase the record marks. CNR was measured after the irradiation, and signal attenuation of 16.5 dB at the maximum was observed for the minimum signal. On the other hand, in the track recorded with the random signal, the ratio of the output after the DC laser beam irradiation to the output before the irradiation was 0.29.

Next, the track irradiated with the DC laser beam was recorded with the random signal at a linear velocity of 3.5 m/s, and clock jitter was then measured. The clock jitter was 16.8% at the minimum, proving that the signals are unable to be used as signals in the reading.

In this sample, degree of erasure by the irradiation of the DC laser beam corresponding the erasing beam is low, and clock jitter is extremely high when the random signal is recorded after the laser beam irradiation. Therefore, rewriting of the information in this sample is impossible.

It is to be noted that, when the power of the DC laser beam is increased beyond 7 mW, the recording layer melted and became amorphous after the laser beam irradiation. In other words, recrystallization of the recording layer could not be accomplished by increasing the laser power.

When the medium that had been initialized and recorded with the random signal under the conditions as described above was further recorded with the random signal under the same conditions and measured for the clock jitter, the clock jitter was unmeasurable (in excess of 20%) and the signal could not be reproduced.

Figure 4:
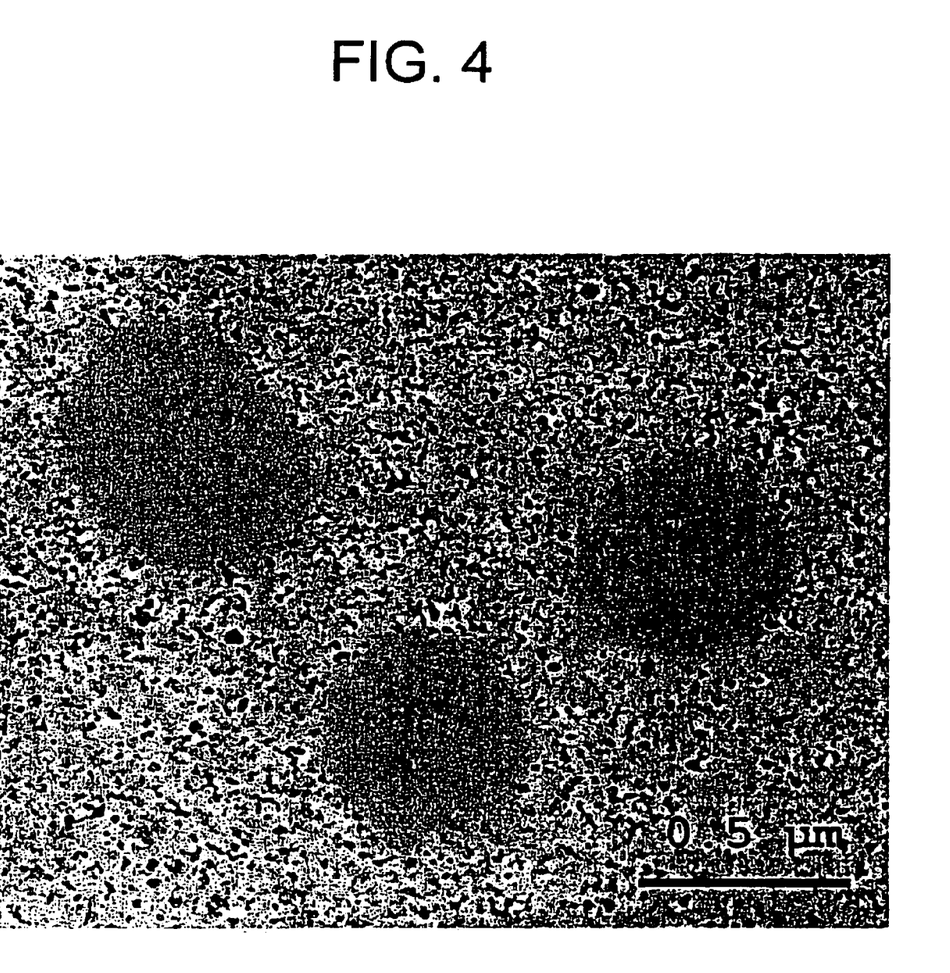
FIG. 4 is another photomicrograph taken by a transmission electron microscope of a recording layer, and this photograph is presented as a substitute for a diagram showing crystalline structure.

After the recording under the conditions as described above, the recording layer of Sample No. 1 was observed on a transmission electron microscope. The minimum record mark was substantially circular as shown in FIG. 4, and as shown in FIG. 4, no recrystallized region was found around the record marks.

Comparative Example 1

Sample No. 2 was produced by repeating the procedure of Example 1 except that the first dielectric layer was formed to a thickness of 120 nm, and the second dielectric layer 32 was formed to a thickness of 50 nm.

Sample No. 2 was recorded with the minimum signal and the random signal as in the case of Example 1 except that the recording power $P_w$ used was 8 mW, and the CNR, output, and jitter were measured. The CNR of the minimum signal was 49 dB, the output of the random signal was 0.98 V, and the jitter was 10%. In other words, CNR was equivalent to that of Example 1 while the jitter was higher than that of Example 1.

When the Sample No. 2 was irradiated with the DC laser beam as in the case of Example 1, attenuation of the carrier for the minimum signal was 18 dB or less. When the medium was recorded again after the irradiation of the DC laser beam, the clock jitter of the re-recorded signal was in excess of 15%.

When the recording layer of Sample No. 2 was observed under transmission electron microscope, the minimum record mark was not circular in shape, but in the shape wherein trailing edge was recessed. The region near the trailing edge was found to be recrystallized. The larger jitter is believed to be due to the larger mark-to-mark variation in the degree of the crystallization.

Comparison Between Write Once Medium and Rewritable Medium

Sample No. 3 was produced by repeating the procedure of Sample No. 1 of Example 1 except that the recording layer had the composition:

This Sample No. 3 is rewritable at a linear velocity of 3.5 m/s since the recording layer of this sample has a crystallization speed faster that that of Sample No. 1.

Sample Nos. 1 and 3 were recorded with the random signal as in the case of Example 1. Then, the area recorded with such random signal was read, and the highest reflection level obtained in this was designated $R_{ini}$. Next, this area was erased by irradiating the area with DC laser beam at the linear velocity the same as the one used in the recording. The power of the DC laser beam irradiated (DC erasing power)

and the linear velocity V used in the irradiation are shown in FIG. 5. Next, the area irradiated with DC laser beam was read, and the highest reflection level and the lowest reflection level were designated $R_{top}$ and $R_{bottom}$, respectively, and $(R_{top}+R_{bottom})/2R_{ini}$ was calculated. The results are shown in FIG. 5. It is to be noted that the reflection level was measured on an optical recording medium evaluator (DDU-1000, manufactured by Pulstech).

In FIG. 5, in Sample No. 3, the relation:

$$(R_{top}+R_{bottom})/2R_{ini} \geq 1$$

was satisfied at the linear velocity 3.5 m/s, and with the DC laser beam power 3 mW or higher, whereas in, Sample No. 1, the relation was such that:

$$(R_{top}+R_{bottom})/2R_{ini} < 1$$

at every linear velocity equal to or higher than 3.5 m/s, and irrespective of the DC laser beam power.

For each case, the medium was irradiated with the DC laser beam of 3 mW or higher, and then, recorded with the random signal under the same conditions as the initial recording to measure the clock jitter. The clock jitter was 8 to 9% in Sample No. 3, and 16.8 to 20% in Sample No. 1. In other words, Sample No. 3 was rewritable at the linear velocity of 3.5 m/s whereas Sample No. 1 was not rewritable at the linear velocity in the range of 3.5 to 14 m/s.

Comparison on Recrystallization Around the Record Marks

Sample No. 4 (Example)

Sample No. 4 of the optical recording disk was produced by the procedure as described below. The light-transparent substrate 2, the first dielectric layer 31, and the protective layer 6 were the same as those of Sample No. 1. The recording layer 4 was formed by sputtering in argon atmosphere. The recording layer 4 had a composition (atomic ratio) of $$(Sb_{0.68}Te_{0.32})_{0.92}(In_{0.4}Ag_{0.6})_{0.08}$$

The recording layer 4 was formed to a thickness of 20 nm.

The second dielectric layer 32 was formed by sputtering in argon atmosphere using $Al_2O_3$ for the target. The second dielectric layer 32 was formed to a thickness of 20 nm.

The reflective layer 5 was formed by sputtering in argon atmosphere using $Ag_{98}Pd_1Cu_1$ for the target. The reflective layer 5 was formed to a thickness of 75 nm.

Sample No. 5 (Comparative Example)

This sample was produced by repeating the procedure of Sample No. 4 except that the second dielectric layer 32 was formed by using ZnS (50 mole %)—$SiO_2$ (50 mole %), and the reflective layer 5 was formed by using Al—1.7 mole % Cr.

Evaluation

The recording layer of the samples as described above was initialized as in the case of Example 1. Next, the samples were recorded with the minimum signal and the random signal once as in the condition of Example 1 except that the recording power $P_w$ used was 13 mW. The recorded information was then read.

Photomicrographs of the recording layer of the recorded samples were taken by a transmission electron microscope as in the case of Example 1. The photomicrograph of Sample No. 5 is shown in FIG. 6. In FIG. 6, the record mark has a substantially circular or ellipsoidal shape. In recrystallized region which is clearly different from the crystalline phase of the non-recorded region was found surrounding the record marks. This recrystallized region had a width of 50 μm. It is to be noted that the area of the photograph taken in FIG. 6 is the same as that of FIG. 4. On the other hand, in the photomicrograph taken by a transmission electron microscope of Sample No. 4, no recrystallized region was found around the circular record marks as in the case of FIG. 4.

The recorded samples were also evaluated for CNR and clock jitter by repeating the procedure of Example 1. The CNR of the minimum signal was measured to be 51 dB in Sample No. 4, and 50 dB in Sample No. 5. The clock jitter of the minimum signal was 6% in Sample No. 4, and 7.5% in Sample No. 5. The clock jitter of the random signal was 8% in Sample No. 4, and 10% in Sample No. 5.

As evident from these results, the CNR is high and the jitter is reduced when the record marks are not surrounded by the recrystallized region.

Next, the samples were evaluated whether each sample could be used as a write once medium by repeating the procedure of Example 1. It was then confirmed that these samples function as a write once medium at a linear velocity 3.5 m/s as in the case of Sample No. 1 in Example 1.

Effect of the Invention

The medium realized in the present invention is a write once phase change medium wherein jitter in the high density recording is low, and wherein output in the reading is sufficiently high.

What is claimed is:

1. An optical recording medium wherein the medium has a phase change recording layer wherein the recording is accomplished such that minimum record marks formed are circular or ellipsoidal and no recrystallized region is present around the record marks; and the medium is a write once medium wherein the recorded information cannot be erased or rewritten at the minimum linear velocity used.

2. An optical recording medium according to claim 1 wherein relations:

$$0.5 \leq x \leq y/2+0.02V_{min}+0.57 \text{ and } x \leq 0.9, 0 \leq y \leq 0.4$$

are satisfied when atomic ratio of the elements constituting said recording layer is represented by:

$$(Sb_xTe_{1-x})_{1-y}M_y \qquad (I)$$

wherein M is an element which is neither Sb nor Te, and the minimum linear velocity used is Vmin (m/s).

3. An optical recording medium according to claim 1 wherein the recorded information can not be erased or rewritten at a linear velocity equal to or higher than 3.49 m/s.

4. An optical recording medium according to claim 1 wherein the recorded information can not be erased or rewritten at a linear velocity equal to or higher than 1.2 m/s.

* * * * *